United States Patent
Zhong et al.

(10) Patent No.: US 11,526,053 B2
(45) Date of Patent: Dec. 13, 2022

(54) OPTICAL ASSEMBLY, LIQUID CRYSTAL DISPLAY DEVICE, AND ELECTRONIC EQUIPMENT

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Xuan Zhong, Beijing (CN); Hongliang Yuan, Beijing (CN); Jian Wang, Beijing (CN); Qi Zheng, Beijing (CN); Wei Zhao, Beijing (CN); Xiaojuan Wu, Beijing (CN); Zhangxiang Cheng, Beijing (CN); Jiaxing Wang, Beijing (CN)

(73) Assignees: BEIJING BOE OPTOELECTRONICS TECHNOLOGY CO., LTD., Beijing (CN); BEIJING BOE TECHNOLOGY DEVELOPMENT CO., LTD., Beijing (CN)

(*) Notice: Subject to any disclaimer, the term of this patent is extended or adjusted under 35 U.S.C. 154(b) by 123 days.

(21) Appl. No.: 16/962,493

(22) PCT Filed: Sep. 26, 2019

(86) PCT No.: PCT/CN2019/108150
§ 371 (c)(1),
(2) Date: Jul. 15, 2020

(87) PCT Pub. No.: WO2021/056331
PCT Pub. Date: Apr. 1, 2021

(65) Prior Publication Data
US 2021/0405457 A1 Dec. 30, 2021

(51) Int. Cl.
G02F 1/13363 (2006.01)
G02F 1/1335 (2006.01)
G02F 1/1337 (2006.01)

(52) U.S. Cl.
CPC ...... *G02F 1/133638* (2021.01); *G02F 1/1337* (2013.01); *G02F 1/133528* (2013.01)

(58) Field of Classification Search
CPC ......... G02F 1/133638; G02F 1/133528; G02F 1/1337
(Continued)

(56) References Cited

U.S. PATENT DOCUMENTS

| | | |
|---|---|---|
| 6,552,767 B1 | 4/2003 | Kaneko |
| 2005/0231660 A1 | 10/2005 | Fujita et al. |
| 2006/0098139 A1* | 5/2006 | Shibazaki ......... G02F 1/133528 349/98 |

FOREIGN PATENT DOCUMENTS

| | | |
|---|---|---|
| CN | 1294698 A | 5/2001 |
| CN | 2715190 Y * | 8/2005 |

(Continued)

*Primary Examiner* — Edward J Glick
*Assistant Examiner* — William D Peterson
(74) *Attorney, Agent, or Firm* — Womble Bond Dickinson (US) LLP

(57) ABSTRACT

The present disclosure provides an optical assembly, a liquid crystal display device, and an electronic equipment. The optical assembly includes: a linear polarizer, a half-wave plate, and a quarter-wave plate stacked in sequence. An absorption axis of the linear polarizer is substantially perpendicular to a first direction, and the first direction is parallel to a surface of the linear polarizer; an angle between an in-plane slow axis of the half-wave plate and the first direction is in a range of 100° to 110°; an angle between an in-plane slow axis of the quarter-wave plate and the first direction is in a range of 160° to 170°.

20 Claims, 8 Drawing Sheets

(58) Field of Classification Search
USPC .......................................................... 349/56
See application file for complete search history.

(56) References Cited

FOREIGN PATENT DOCUMENTS

| | | |
|---|---|---|
| CN | 2715190 Y | 8/2005 |
| CN | 1683972 A | 10/2005 |
| CN | 1726423 A | 1/2006 |
| CN | 1740853 A | 3/2006 |
| JP | 2007-187741 A | 7/2007 |

* cited by examiner

| | Embodiment | Comparative embodiment 1 | Comparative embodiment 2 | Comparative embodiment 3 |
|---|---|---|---|---|
| R | 43.3% | 10.3% | 24.8% | 33.3% |
| CR | 34.9 | 15.5 | 17.3 | 16.5 |
| Wx,Wy | 0.330, 0.363 | 0.325, 0.358 | 0.337, 0.360 | 0.356, 0.393 |
| Evaluation | OK | R↓ | CR↓ | CC↑ | ant
OPTICAL ASSEMBLY, LIQUID CRYSTAL DISPLAY DEVICE, AND ELECTRONIC EQUIPMENT

RELATED APPLICATIONS

The present application is a 35 U.S.C. 371 national stage application of PCT International Application No. PCT/CN2019/108150, filed on Sep. 26, 2019, and claims the benefit of PCT International Application No. PCT/CN2019/108150, filed on Sep. 26, 2019, the entire disclosures of which are incorporated herein by reference.

TECHNICAL FIELD

The present disclosure relates to the field of display technology, and in particular to an optical assembly, a liquid crystal display device, and an electronic equipment.

BACKGROUND

Reflective liquid crystal display devices have great market potential in the fields of electronic tags, e-books, electronic wear, etc. due to their advantages such as lightness and thinness (no backlight), low power consumption, and low cost. The current twisted nematic (TN) normally white liquid crystal display (LCD) is a mainstream reflective liquid crystal display device. The twisted nematic normally white liquid crystal display device reflects the light from the environment, thereby realizing the image display.

SUMMARY

According to an aspect of the present disclosure, an optical assembly is provided. The optical assembly includes a linear polarizer, a half-wave plate, and a quarter-wave plate stacked in sequence. An absorption axis of the linear polarizer is substantially perpendicular to a first direction, and the first direction is parallel to a surface of the linear polarizer; an angle between an in-plane slow axis of the half-wave plate and the first direction is in a range of 100° to 110°; an angle between an in-plane slow axis of the quarter-wave plate and the first direction is in a range of 160° to 170°.

Optionally, the absorption axis of the linear polarizer is perpendicular to the first direction; the angle between the in-plane slow axis of the half-wave plate and the first direction is 105°; the angle between the in-plane slow axis of the quarter-wave plate and the first direction is 165°.

Optionally, a material of the half-wave plate and/or a material of the quarter-wave plate is a material having reverse wavelength dispersion characteristics; the material having reverse wavelength dispersion characteristics is a cycloolefin polymer.

Optionally, a retardation of the half-wave plate at a wavelength of 550 nm is in a range of 260 nm~280 nm, and a retardation of the quarter-wave plate at a wavelength of 550 nm is in a range of 130 nm~150 nm; alternatively, a retardation of the half-wave plate at a wavelength of 550 nm is 270 nm, and a retardation of the quarter-wave plate at a wavelength of 550 nm is 140 nm.

According to another aspect of the present disclosure, a liquid crystal display device is provided. The liquid crystal display device includes an optical assembly and a liquid crystal cell stacked together. The optical assembly includes a linear polarizer, a half-wave plate, and a quarter-wave plate stacked in sequence. An absorption axis of the linear polarizer is substantially perpendicular to a first direction, and the first direction is parallel to a surface of the linear polarizer; an angle between an in-plane slow axis of the half-wave plate and the first direction is in a range of 100° to 110°; an angle between an in-plane slow axis of the quarter-wave plate and the first direction is in a range of 160° to 170°, and the liquid crystal cell is on a side of the quarter-wave plate away from the linear polarizer.

Optionally, the liquid crystal cell is a twisted nematic liquid crystal cell, and a twist angle of the twisted nematic liquid crystal cell is in a range of 70° to 80°.

Optionally, a retardation of the liquid crystal cell at a wavelength of 550 nm is in a range of 180 nm~210 nm.

Optionally, the liquid crystal cell includes a first substrate and a second substrate, the first substrate is between the second substrate and the optical assembly; the first substrate includes a first alignment layer, and an angle between an orientation direction of the first alignment layer and the first direction is in a range of 220° to 230°; the second substrate includes a second alignment layer, and an angle between an orientation direction of the second alignment layer and the first direction is in a range of 110° to 130°.

Optionally, the angle between the orientation direction of the first alignment layer and the first direction is 225°; the angle between the orientation direction of the second alignment layer and the first direction is 120°.

Optionally, the absorption axis of the linear polarizer is perpendicular to the first direction; the angle between the in-plane slow axis of the half-wave plate and the first direction is 105°; the angle between the in-plane slow axis of the quarter-wave plate and the first direction is 165°.

Optionally, a material of the half-wave plate and/or a material of the quarter-wave plate is a material having reverse wavelength dispersion characteristics; the material having reverse wavelength dispersion characteristics is a cycloolefin polymer.

Optionally, a retardation of the half-wave plate at a wavelength of 550 nm is in a range of 260 nm~280 nm, and a retardation of the quarter-wave plate at a wavelength of 550 nm is in a range of 130 nm~150 nm; alternatively, a retardation of the half-wave plate at a wavelength of 550 nm is 270 nm, and a retardation of the quarter-wave plate at a wavelength of 550 nm is 140 nm.

According to yet another aspect of the present disclosure, an electronic equipment is provided. The electronic equipment includes the liquid crystal display device according to the above embodiments.

BRIEF DESCRIPTION OF THE DRAWINGS

In order to more clearly illustrate the technical solutions in embodiments of the disclosure or in the prior art, the appended drawings needed to be used in the description of the embodiments or the prior art will be introduced briefly in the following. Obviously, the drawings in the following description are only some embodiments of the disclosure, and for those of ordinary skill in the art, other drawings may be obtained according to these drawings under the premise of not paying out undue experimentation.

DETAILED DESCRIPTION OF THE DISCLOSURE

In the following, the technical solutions in embodiments of the disclosure will be described clearly and completely in connection with the drawings in the embodiments of the disclosure. Obviously, the described embodiments are only part of the embodiments of the disclosure, and not all of the embodiments. Based on the embodiments in the disclosure, all other embodiments obtained by those of ordinary skill in the art under the premise of not paying out undue experimentation pertain to the protection scope of the disclosure.

The inventors noticed that the current twisted nematic normally white LCD structure is a relatively mainstream structure of the total reflection type display device. In the twisted nematic normally white LCD structure, polarizers, half-wave plates and quarter-wave plates are used in conjunction with the liquid crystal cell to realize the conversion between linearly polarized light and circularly polarized light. Thus, the opening/closing of the optical path can be achieved in the power off/power on state. However, since the half-wave plate, quarter-wave plate, and liquid crystal cell all have dispersion, when converted between linearly polarized light and circularly polarized light, there are different conversion efficiencies of light for different wavelength bands of the entire visible light. Therefore, the total reflection LCD screen has the problems of low brightness (low reflectivity), low contrast, color cast (yellow and/or blue).

Figure 1:
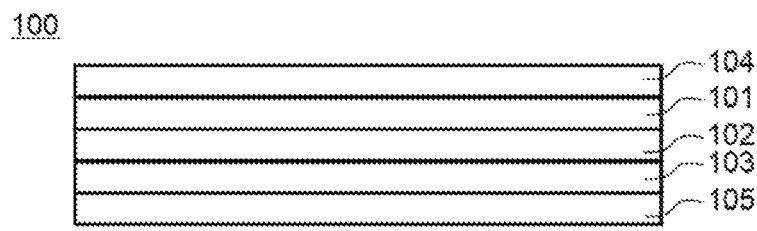
FIG. 1 is a structural schematic diagram of an optical assembly according to an embodiment of the present disclosure.
Figure 2:
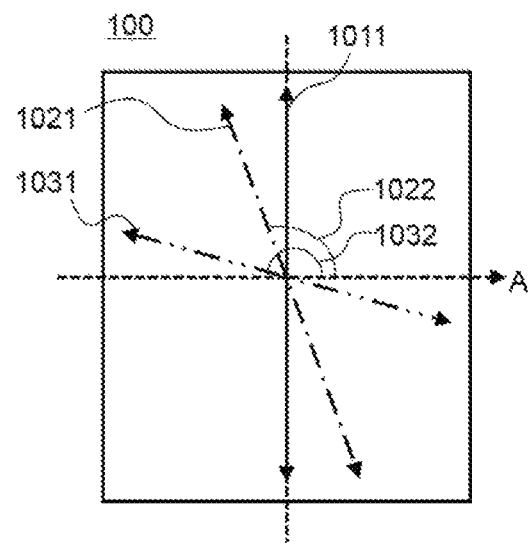
FIG. 2 shows design parameters of an optical assembly according to an embodiment of the present disclosure.

According to an aspect of the present disclosure, an optical assembly is provided. As shown in FIG. 1, the optical assembly 100 includes a linear polarizer 101, a half-wave plate 102, and a quarter-wave plate 103 stacked in sequence. As shown in FIG. 2, an absorption axis 1011 of the linear polarizer 101 is substantially perpendicular to a first direction A, and the first direction A is parallel to a surface of the linear polarizer 101; an angle 1022 between an in-plane slow axis 1021 of the half-wave plate 102 and the first direction A is in a range of 100° to 110°; an angle 1032 between an in-plane slow axis 1031 of the quarter-wave plate 103 and the first direction A is in a range of 160° to 170°.

Those skilled in the art can understand that an optical clear adhesive (not shown in the figure) may also be provided between the linear polarizer 101, the half-wave plate 102, and the quarter-wave plate 103, thereby forming a stable structure. In addition, a protective film 104 may be disposed on a side of the linear polarizer 101 away from the half-wave plate 102, and a release film 105 may be disposed on a side of the quarter-wave plate 103 away from the half-wave plate 102.

With the above configuration, when the optical assembly having the above structure is applied to a reflective liquid crystal display device, the linear polarization-circular polarization conversion efficiency for light in different wavelength bands of visible light is improved, light leakage in dark state is reduced, thereby realizing high reflectivity, high contrast and low color cast. According to the embodiments of the present disclosure, an optimized combination design of linear polarizer, half-wave plate, quarter-wave plate and liquid crystal cell can be realized, the influence of the dispersion effect of the half-wave plate, quarter-wave plate and liquid crystal cell is reduced, the linear polarization-circular polarization conversion efficiency for light in different wavelength bands of visible light is improved, thereby achieving high reflectivity, high contrast and low color cast for the reflective liquid crystal display device.

Figure 3:
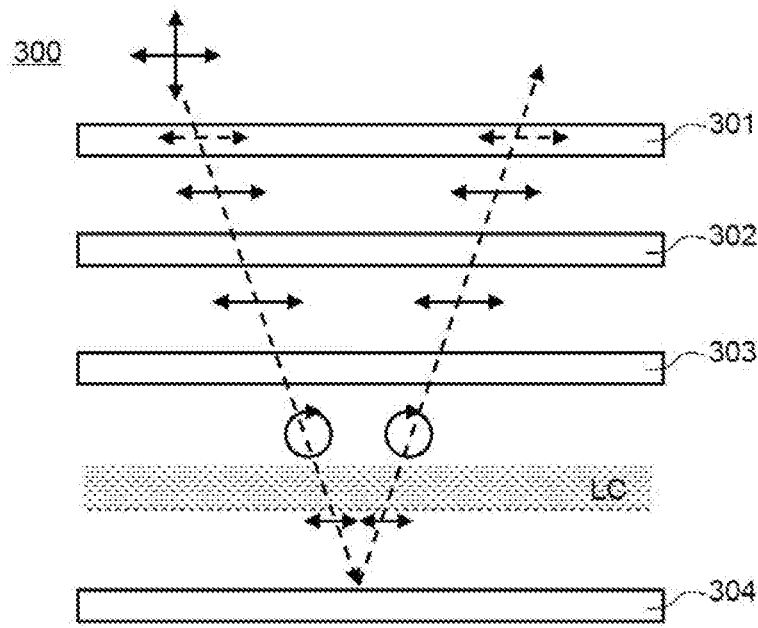
FIG. 3 is a principle schematic diagram of an optical assembly in bright state display according to an embodiment of the present disclosure.
Figure 4:
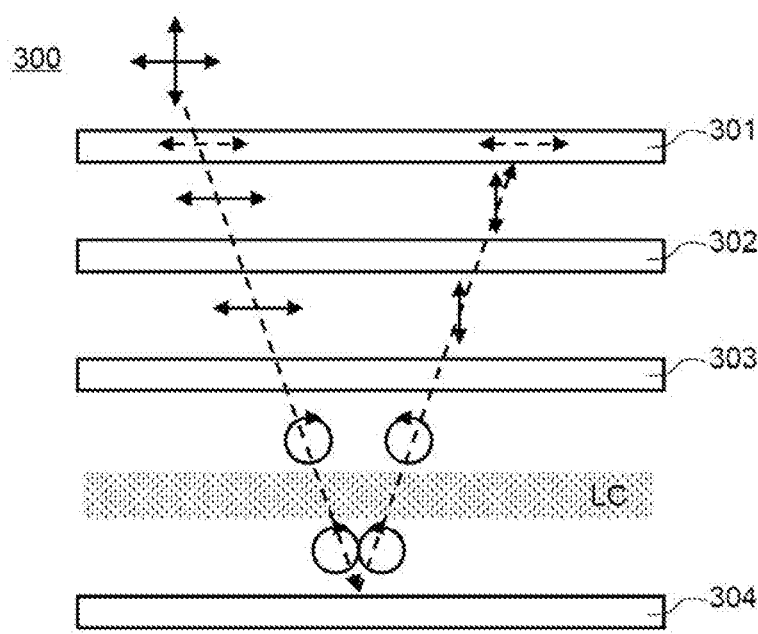
FIG. 4 is a principle schematic diagram of an optical assembly in dark state display according to an embodiment of the present disclosure.

FIG. 3 is a principle schematic diagram of an optical assembly in bright state display according to an embodiment of the present disclosure. FIG. 4 is a principle schematic diagram of an optical assembly in dark state display according to an embodiment of the present disclosure.

As shown in FIG. 3, when the reflective liquid crystal display device 300 operates in a bright state (power off), the incident light is converted into right-handed circularly polarized light after passing through the linear polarizer 301, the half-wave plate 302, and the quarter-wave plate 303. After passing through the twisted liquid crystal LC twice and reflected by the reflective layer 304, the right-handed circularly polarized light is converted into right-handed circularly polarized light. The reflected light is converted into linearly polarized light parallel to the transmission axis of the linear polarizer 301 after passing through the quarter-wave plate 303 and the half-wave plate 302, and exits from the reflective liquid crystal display device 300, thereby realizing bright state display.

As shown in FIG. 4, when the reflective liquid crystal display device 300 operates in a dark state (power on), the long axes of liquid crystal molecules are aligned in the vertical direction. At this time, the liquid crystal cell has no optical rotation and birefringence. The incident light is converted into right-handed circularly polarized light after passing through the linear polarizer 301, the half-wave plate 302, and the quarter-wave plate 303. The right-handed circularly polarized light is reflected by the reflective layer 304 and becomes left-handed circularly polarized light. The reflected light is converted into linearly polarized light perpendicular to the transmission axis of the linear polarizer 301 after passing through the quarter-wave plate 303 and the half-wave plate 302, and cannot exit is from the reflective liquid crystal display device 300, thereby realizing dark state display.

Optionally, the absorption axis of the linear polarizer is perpendicular to the first direction; the angle between the in-plane slow axis of the half-wave plate and the first direction is 105°; the angle between the in-plane slow axis of the quarter-wave plate and the first direction is 165°.

Optionally, a material of the half-wave plate and/or a material of the quarter-wave plate is a material having reverse wavelength dispersion characteristics.

With the above configuration, the dispersion of the half-wave plate, the dispersion of the quarter-wave plate, and the dispersion of the liquid crystal layer cancel each other, thereby further improving reflectivity and contrast, and reducing color cast.

Optionally, the material having reverse wavelength dispersion characteristics is a cycloolefin polymer (COP). PC materials and liquid crystal materials having reverse wavelength dispersion characteristics can also be used to make the half-wave plate and the quarter-wave plate, and the present disclosure is not limited thereto.

Optionally, a retardation of the half-wave plate at a wavelength of 550 nm is in a range of 260 nm~280 nm, and a retardation of the quarter-wave plate at a wavelength of 550 nm is in a range of 130 nm~150 nm; alternatively, a retardation of the half-wave plate at a wavelength of 550 nm is 270 nm, and a retardation of the quarter-wave plate at a wavelength of 550 nm is 140 nm.

Figure 5:
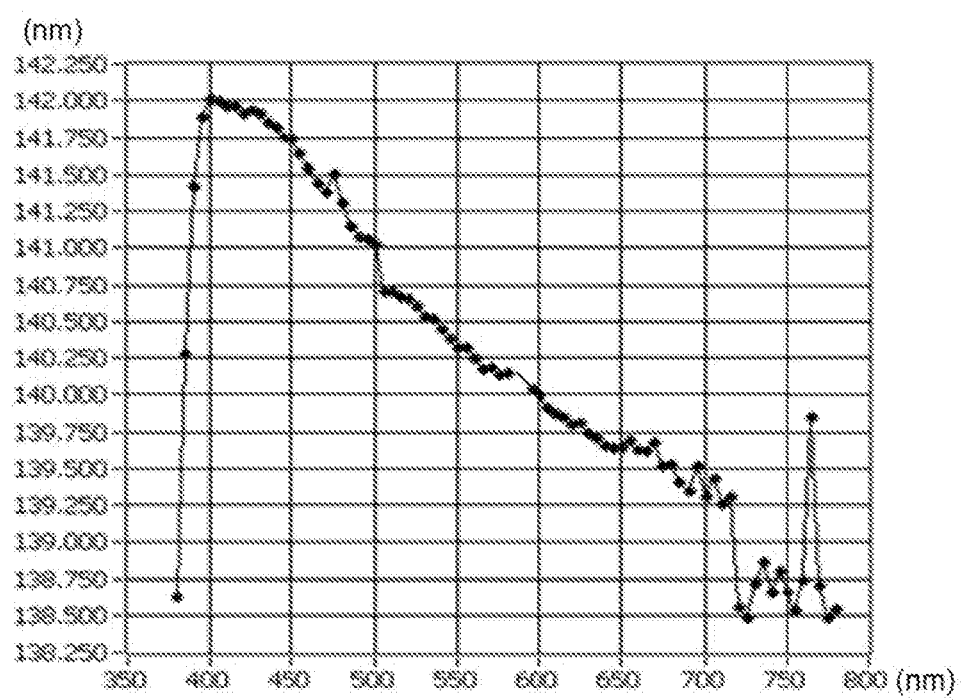
FIG. 5 is a dispersion curve of a quarter-wave plate according to an embodiment of the present disclosure.
Figure 6:
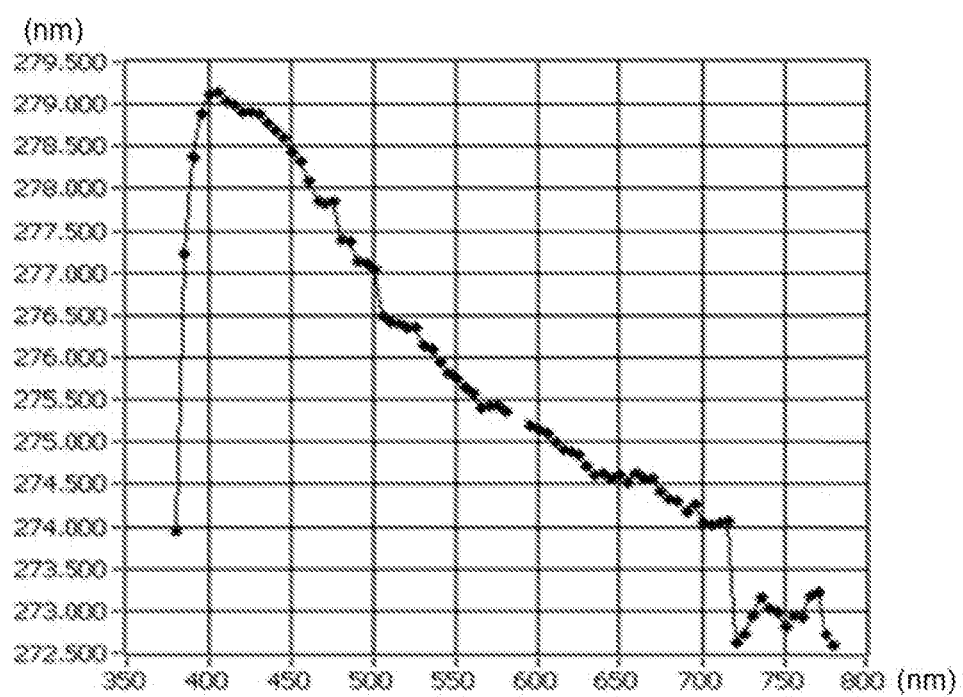
FIG. 6 is a dispersion curve of a half-wave plate according to an embodiment of the present disclosure.

FIG. 5 is a dispersion curve of a quarter-wave plate according to an embodiment of the present disclosure, where the horizontal axis indicates the wavelength and the vertical axis indicates the retardation. FIG. 6 is a dispersion curve of a half-wave plate according to an embodiment of the present disclosure, where the horizontal axis indicates the wavelength and the vertical axis indicates the retardation. With the above configuration, the quarter-wave plate and the half-wave plate can achieve a desired retardation in the visible light band. It can be seen from FIGS. 5 and 6 that as the wavelength increases, the retardation between two orthogonal components decreases. In this way, the normal wavelength dispersion of other film layers (for example, polarizers) in the optical assembly or the liquid crystal layer used with the optical assembly can be cancelled. Therefore, when the light is adjusted by the optical assembly, for all (e.g., blue, green, and yellow) wavelengths, the retardation between two orthogonal components corresponds to a quarter wavelength or a half wavelength, thereby reducing color cast.

Optionally, the linear polarizer includes a polyvinyl alcohol film and a cellulose triacetate film stacked together.

The linear polarizer may include a polyvinyl alcohol (PVA) film and a cellulose triacetate (TAC) film stacked together. Thus, the linear polarizer can be constructed using only the polyvinyl alcohol film and the cellulose triacetate film, such that the structure is simple and easy to realize.

Figure 7:
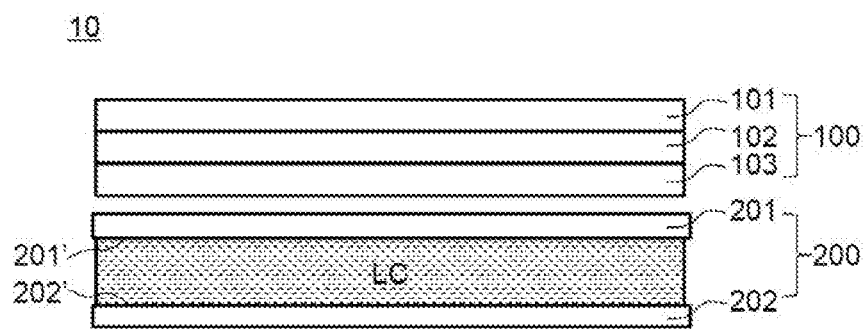
FIG. 7 is a structural schematic diagram of a liquid crystal display device according to an embodiment of the present disclosure.

According to another aspect of the present disclosure, a liquid crystal display device is provided. As shown in FIG. 7, the liquid crystal display device 10 includes an optical assembly 100 and a liquid crystal cell 200 stacked together. As shown in FIG. 2, the optical assembly 100 includes a linear polarizer 101, a half-wave plate 102, and a quarter-wave plate 103 stacked in sequence. An absorption axis 1011 of the linear polarizer 101 is substantially perpendicular to a first direction A, and the first direction A is parallel to a surface of the linear polarizer 101; an angle 1022 between an in-plane slow axis 1021 of the half-wave plate 102 and the first direction A is in a range of 100° to 110°; an angle 1032 between an in-plane slow axis 1031 of the quarter-wave plate 103 and the first direction A is in a range of 160° to 170°. The liquid crystal cell 200 is on a side of the quarter-wave plate 103 away from the linear polarizer 101.

With the above configuration, when the optical assembly having the above structure is applied to a reflective liquid crystal display device, the linear polarization-circular polarization conversion efficiency for light in different wavelength bands of visible light is improved, light leakage in dark state is reduced, thereby realizing high reflectivity, high contrast and low color cast. According to the embodiments of the present disclosure, an optimized combination design of linear polarizer, half-wave plate, quarter-wave plate and liquid crystal cell can be realized, the influence of the dispersion effect of the half-wave plate, quarter-wave plate and liquid crystal cell is reduced, the linear polarization-circular polarization conversion efficiency for light in different wavelength bands of visible light is improved, thereby achieving high reflectivity, high contrast and low color cast for the reflective liquid crystal display device.

Optionally, the liquid crystal cell is a twisted nematic liquid crystal cell, and the twist angle of the twisted nematic liquid crystal cell is in a range of 70° to 80°.

In some embodiments, the liquid crystal cell is a twisted nematic liquid crystal cell, and the twist angle of the twisted nematic liquid crystal cell is in the range of 70° to 80°. With the above configuration, high reflectivity, high contrast, and low color cast of the reflective liquid crystal display device are further realized.

Optionally, a retardation of the liquid crystal cell at a wavelength of 550 nm is in a range of 180 nm~210 nm.

In some embodiments, the retardation of the liquid crystal cell at the wavelength of 550 nm is in the range of 180 nm~210 nm. In this way, the combination design of the linear polarizer, the half-wave plate, the quarter-wave plate and the liquid crystal cell is further optimized to reduce the influence of the dispersion effect of the half-wave plate, quarter-wave plate and liquid crystal cell.

Figure 8:
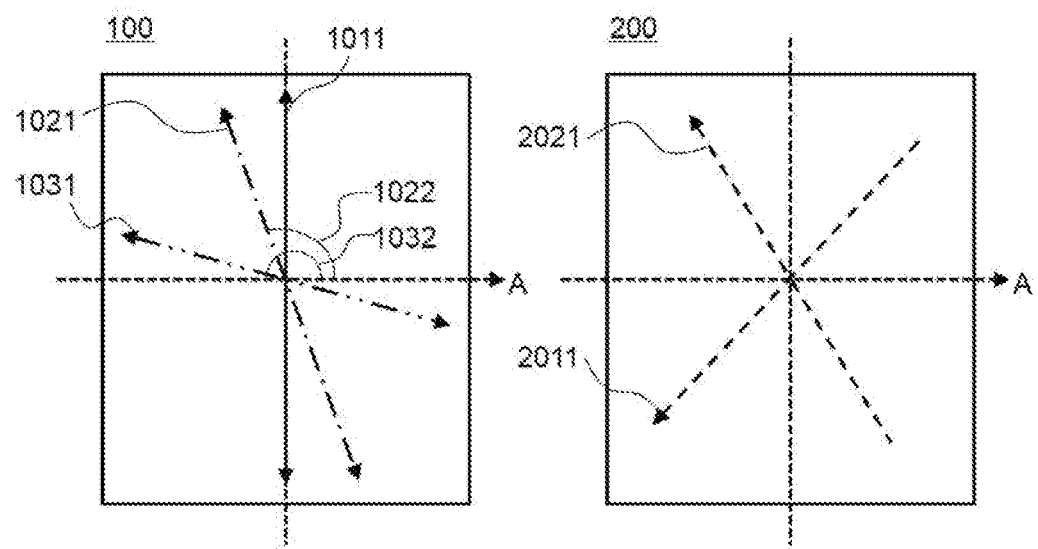
FIG. 8 shows design parameters of a liquid crystal display device according to an embodiment of the present disclosure.

Optionally, as shown in FIGS. 7 and 8, the liquid crystal cell 200 includes a first substrate 201 and a second substrate 202, the first substrate 201 is between the second substrate 202 and the optical assembly 100; the first substrate 201 includes a first alignment layer 201', and an angle between an orientation direction 2011 of the first alignment layer 201' and the first direction A is in a range of 220° to 230°; the second substrate 202 includes a second alignment layer 202', and an angle between an orientation direction 2021 of the second alignment layer 202' and the first direction A is in a range of 110° to 130°.

Those skilled in the art can understand that the first substrate 201 may be a color filter substrate, and the second substrate 202 may be an array substrate.

Optionally, the angle between the orientation direction of the first alignment layer and the first direction is 225°; the angle between the orientation direction of the second alignment layer and the first direction is 120°.

With the above configuration, the twist angle of the twisted nematic liquid crystal cell is in the range of 70° to 80°, and the twisted nematic liquid crystal cell can match with the linear polarizer, the half-wave plate, and the quarter-wave plate, thereby realizing high reflectivity, high contrast and low color cast of the reflective liquid crystal display device.

Optionally, the absorption axis of the linear polarizer is perpendicular to the first direction; the angle between the in-plane slow axis of the half-wave plate and the first direction is 105°; the angle between the in-plane slow axis of the quarter-wave plate and the first direction is 165°.

Optionally, a material of the half-wave plate and/or a material of the quarter-wave plate is a material having reverse wavelength dispersion characteristics.

With the above configuration, the dispersion of the half-wave plate, the dispersion of the quarter-wave plate, and the dispersion of the liquid crystal layer cancel each other, thereby further improving reflectivity and contrast, and reducing color cast.

Optionally, the material having reverse wavelength dispersion characteristics is a cycloolefin polymer (COP). PC materials and liquid crystal materials having reverse wavelength dispersion characteristics can also be used to make the half-wave plate and the quarter-wave plate, and the present disclosure is not limited thereto.

Optionally, a retardation of the half-wave plate at a wavelength of 550 nm is in a range of 260 nm~280 nm, and a retardation of the quarter-wave plate at a wavelength of 550 nm is in a range of 130 nm~150 nm; alternatively, a retardation of the half-wave plate at a wavelength of 550 nm is 270 nm, and a retardation of the quarter-wave plate at a wavelength of 550 nm is 140 nm.

Optionally, the linear polarizer includes a polyvinyl alcohol film and a cellulose triacetate film stacked together.

The linear polarizer may include a polyvinyl alcohol (PVA) film and a cellulose triacetate (TAC) film stacked together. Thus, the linear polarizer can be constructed using only the polyvinyl alcohol film and the cellulose triacetate film, such that the structure is simple and easy to realize.

According to yet another aspect of the present disclosure, an electronic equipment is provided. The electronic equipment includes the liquid crystal display device according to the above embodiments. The implementation of the electronic equipment can refer to the embodiments of the above-mentioned liquid crystal display device, and the repetition will not be repeated.

The simulation results and measured results of the liquid crystal display device of the embodiment of the present disclosure and the liquid crystal display device of the comparative example will be described below.

FIG. 8 shows design parameters of a liquid crystal display device according to an embodiment of the present disclosure. As shown in FIG. 8, the absorption axis 1011 of the linear polarizer 101 is substantially perpendicular to the first direction A. The angle 1022 between the in-plane slow axis 1021 of the half-wave plate 102 and the first direction A is 115°. The angle 1032 between the in-plane slow axis 1031 of the quarter-wave plate 103 and the first direction A is 165°. In addition, the angle between the orientation direction 2011 of the first alignment layer and the first direction A is 225°; the angle between the orientation direction 2021 of the second alignment layer and the first direction A is 120°. The twist angle of the liquid crystal is 75°, and the retardation of the liquid crystal cell at the wavelength of 550 nm is 195 nm.

Figure 9:
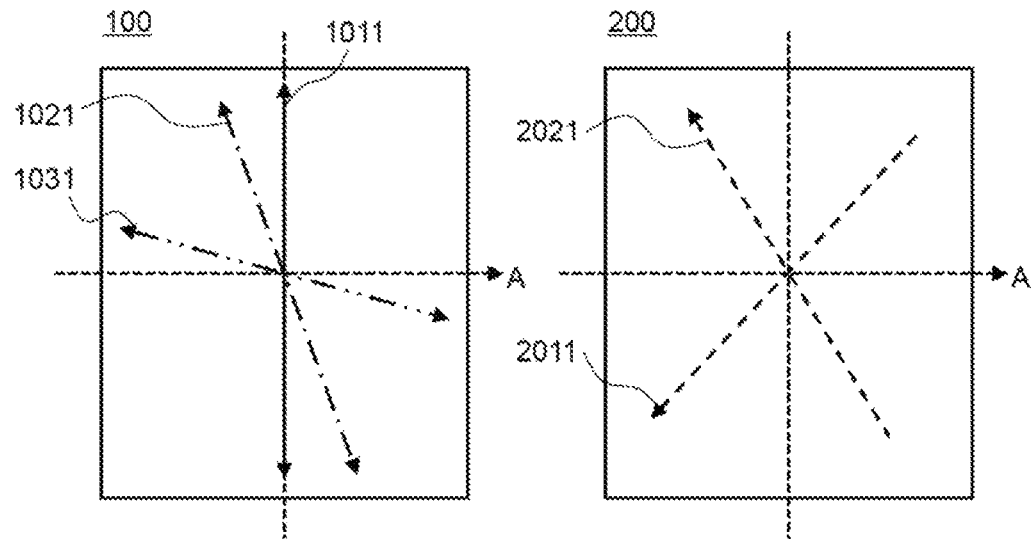
FIG. 9 shows design parameters of a liquid crystal display device of a comparative embodiment.

FIG. 9 shows design parameters of a liquid crystal display device of a comparative embodiment. As shown in FIG. 9, the absorption axis 1011 of the linear polarizer is substantially perpendicular to the first direction A. The angle between the in-plane slow axis 1021 of the half-wave plate and the first direction A is 105°. The angle between the in-plane slow axis 1031 of the quarter-wave plate and the first direction A is 165°. In addition, the angle between the orientation direction 2011 of the first alignment layer and the first direction A is 225°; the angle between the orientation direction 2021 of the second alignment layer and the first direction A is 120°. The twist angle of the liquid crystal is 75°, and the retardation of the liquid crystal cell at the wavelength of 550 nm is 160 nm.

Figure 10:
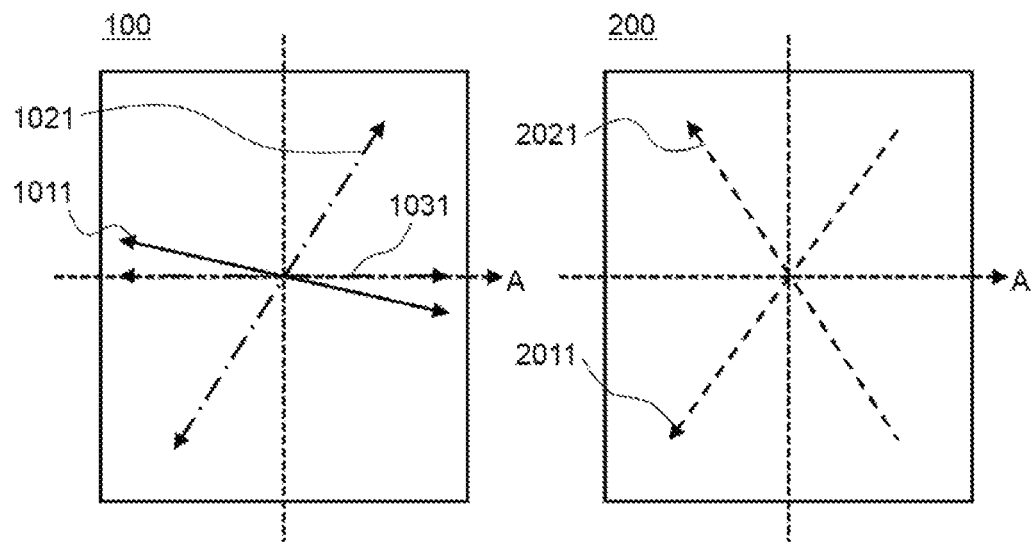
FIG. 10 shows design parameters of a liquid crystal display device of another comparative embodiment.

FIG. 10 shows design parameters of a liquid crystal display device of another comparative embodiment. As shown in FIG. 10, the angle between the absorption axis 1011 of the linear polarizer and the first direction A is 170°. The angle between the in-plane slow axis 1021 of the half-wave plate and the first direction A is 62.5°. The angle between the in-plane slow axis 1031 of the quarter-wave plate and the first direction A is 0°. In addition, the angle between the orientation direction 2011 of the first alignment layer and the first direction A is 235°; the angle between the orientation direction 2021 of the second alignment layer and the first direction A is 125°. The twist angle of the liquid crystal is 70°, and the retardation of the liquid crystal cell at the wavelength of 550 nm is 260 nm.

Figures 11, 12:
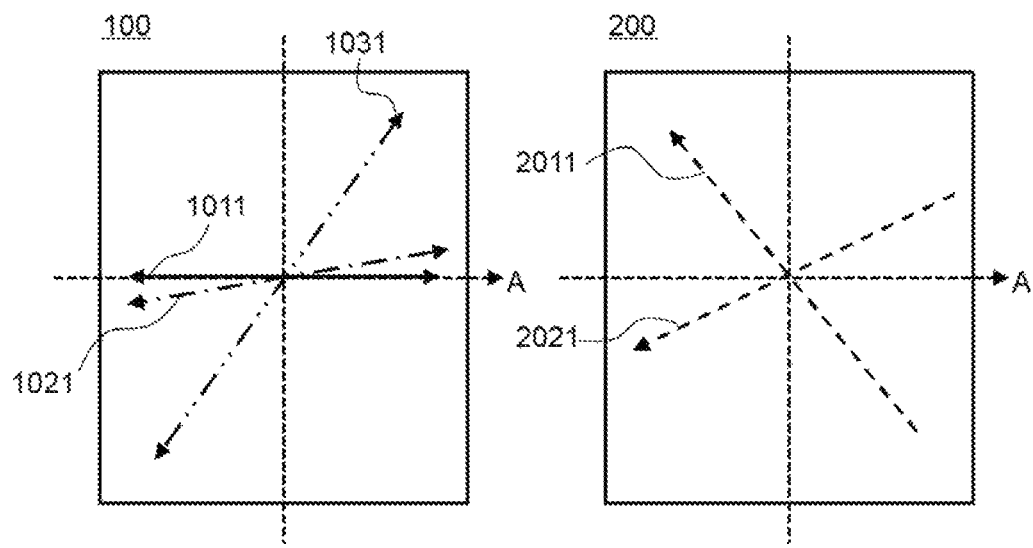
FIG. 11 shows design parameters of a liquid crystal display device of yet another comparative embodiment.
FIG. 12 shows measured results of a liquid crystal display device of the embodiment of the present disclosure and measured results of a liquid crystal display device of the comparative embodiment.

FIG. 11 shows design parameters of a liquid crystal display device of yet another comparative embodiment. As shown in FIG. 11, the absorption axis 1011 of the linear polarizer is substantially parallel to the first direction A. The angle between the in-plane slow axis 1021 of the half-wave plate and the first direction A is 15°. The angle between the in-plane slow axis 1031 of the quarter-wave plate and the first direction A is 75°. In addition, the angle between the orientation direction 2011 of the first alignment layer and the first direction A is 130°; the angle between the orientation direction 2021 of the second alignment layer and the first direction A is 210°. The twist angle of the liquid crystal is 80°, and the retardation of the liquid crystal cell at the wavelength of 550 nm is 260 nm.

FIG. 12 shows the measured results of the liquid crystal display device of the embodiment of the present disclosure and the measured results of the liquid crystal display device of the comparative embodiment.

Figure 13:
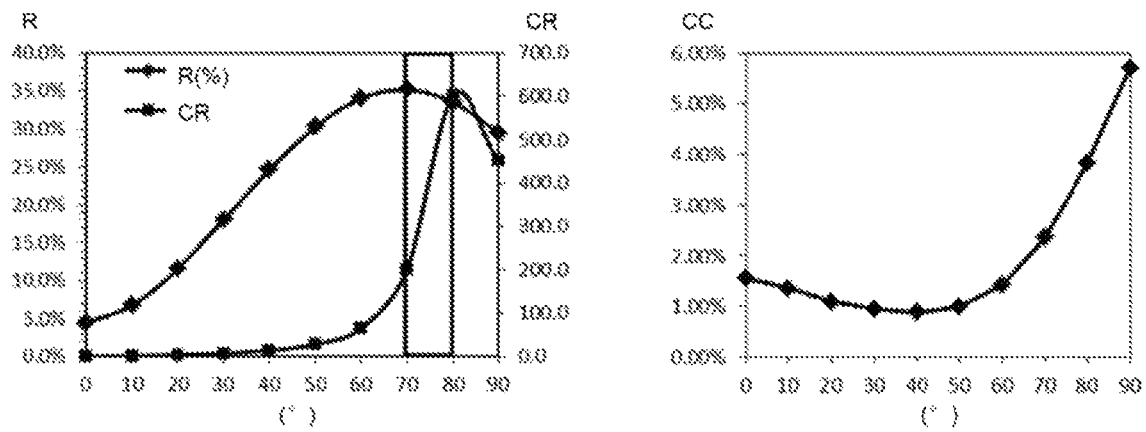
FIG. 13 shows a retardation curve with the twist angle of the liquid crystal as a variable.

FIG. 13 shows a retardation curve with the twist angle of the liquid crystal as a variable. The horizontal axis represents the twist angle (°) of the liquid crystal, and the three vertical axes represent reflectivity (R), contrast (CR), and color cast (CC), respectively.

Figure 14:
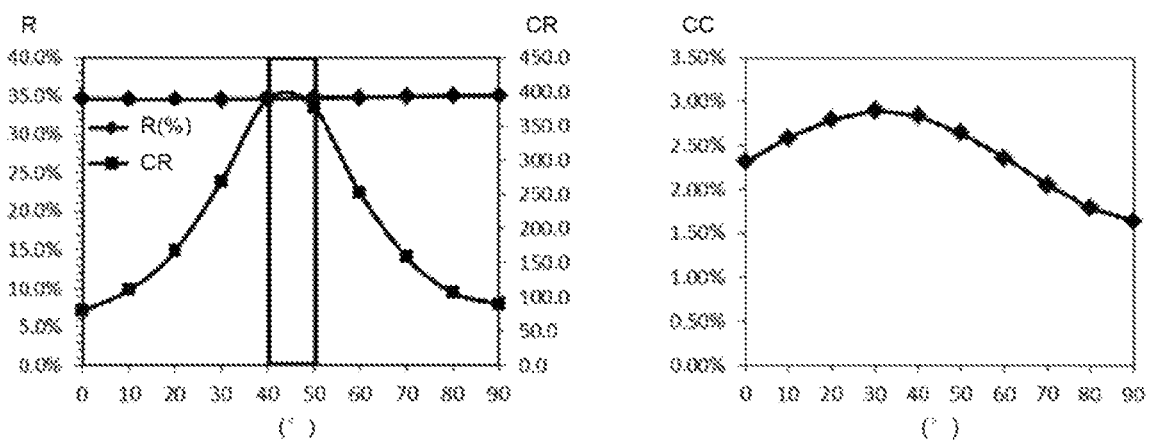
FIG. 14 shows a retardation curve with the orientation direction of the first alignment layer as a variable.

FIG. 14 shows a retardation curve with the orientation direction of the first alignment layer as a variable. The horizontal axis represents the orientation direction (°) of the first alignment layer relative to the first direction A, and the three vertical axes represent reflectivity (R), contrast (CR), and color cast (CC), respectively.

Figure 15:
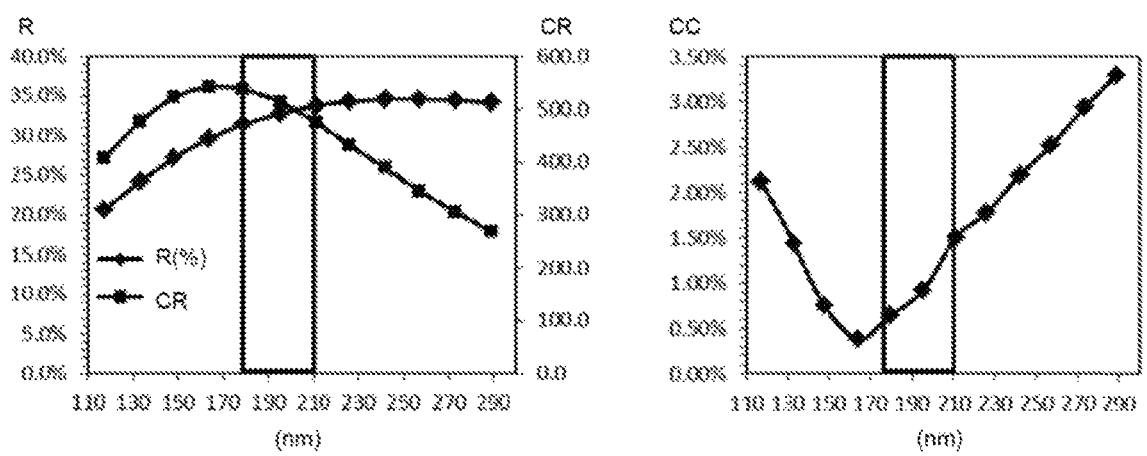
FIG. 15 shows a retardation curve with the retardation of the liquid crystal cell as a variable.

FIG. 15 shows a retardation curve with the retardation of the liquid crystal cell as a variable. The horizontal axis represents the retardation (nm) of the liquid crystal cell, and the three vertical axes represent reflectivity (R), contrast (CR), and color cast (CC), respectively As can be seen from FIGS. 12-15, according to the embodiments of the present disclosure, an optimized combination design of linear polarizer, half-wave plate, quarter-wave plate and liquid crystal cell can be realized, the influence of the dispersion effect of the half-wave plate, quarter-wave plate and liquid crystal cell is reduced, the linear polarization-circular polarization conversion efficiency for light in different wavelength bands of visible light is improved, thereby achieving high reflectivity, high contrast and low color cast for the reflective liquid crystal display device.

According to another aspect of the present disclosure, a method for manufacturing a liquid crystal display device is also provided. The method includes attaching an optical assembly to a liquid crystal cell. The optical assembly includes a linear polarizer, a half-wave plate, and a quarter-wave plate stacked in sequence. An absorption axis of the linear polarizer is substantially perpendicular to a first direction, and the first direction is parallel to a surface of the linear polarizer; an angle between an in-plane slow axis of the half-wave plate and the first direction is in a range of 100° to 110°; an angle between an in-plane slow axis of the quarter-wave plate and the first direction is in a range of 160° to 170°, and the liquid crystal cell is on a side of the quarter-wave plate away from the linear polarizer.

With the above configuration, when the optical assembly having the above structure is applied to a reflective liquid crystal display device, the linear polarization-circular polarization conversion efficiency for light in different wavelength bands of visible light is improved, light leakage in dark state is reduced, thereby realizing high reflectivity, high contrast and low color cast. According to the embodiments of the present disclosure, an optimized combination design of linear polarizer, half-wave plate, quarter-wave plate and liquid crystal cell can be realized, the influence of the dispersion effect of the half-wave plate, quarter-wave plate and liquid crystal cell is reduced, the linear polarization-circular polarization conversion efficiency for light in different wavelength bands of visible light is improved, thereby achieving high reflectivity, high contrast and low color cast for the reflective liquid crystal display device.

Optionally, the liquid crystal cell is a twisted nematic liquid crystal cell, and the twist angle of the twisted nematic liquid crystal cell is in a range of 70° to 80°.

In some embodiments, the liquid crystal cell is a twisted nematic liquid crystal cell, and the twist angle of the twisted nematic liquid crystal cell is in the range of 70° to 80°. With the above configuration, high reflectivity, high contrast, and low color cast of the reflective liquid crystal display device are further realized.

Optionally, a retardation of the liquid crystal cell at a wavelength of 550 nm is in a range of 180 nm~210 nm.

In some embodiments, the retardation of the liquid crystal cell at the wavelength of 550 nm is in the range of 180 nm~210 nm. In this way, the combination design of the linear polarizer, the half-wave plate, the quarter-wave plate and the liquid crystal cell is further optimized to reduce the influence of the dispersion effect of the half-wave plate, quarter-wave plate and liquid crystal cell.

Optionally, as shown in FIGS. 7 and 8, the liquid crystal cell 200 includes a first substrate 201 and a second substrate 202, the first substrate 201 is between the second substrate 202 and the optical assembly 100; the first substrate 201 includes a first alignment layer 201', and an angle between an orientation direction 2011 of the first alignment layer 201' and the first direction A is in a range of 220° to 230°; the second substrate 202 includes a second alignment layer 202', and an angle between an orientation direction 2021 of the second alignment layer 202' and the first direction A is in a range of 110° to 130°.

Those skilled in the art can understand that the first substrate 201 may be a color filter substrate, and the second substrate 202 may be an array substrate.

Optionally, the angle between the orientation direction of the first alignment layer and the first direction is 225°; the angle between the orientation direction of the second alignment layer and the first direction is 120°.

With the above configuration, the twist angle of the twisted nematic liquid crystal cell is in the range of 70° to 80°, and the twisted nematic liquid crystal cell can match with the linear polarizer, the half-wave plate, and the quarter-wave plate, thereby realizing high reflectivity, high contrast and low color cast of the reflective liquid crystal display device.

Optionally, the absorption axis of the linear polarizer is perpendicular to the first direction; the angle between the in-plane slow axis of the half-wave plate and the first direction is 105°; the angle between the in-plane slow axis of the quarter-wave plate and the first direction is 165°.

Optionally, a material of the half-wave plate and/or a material of the quarter-wave plate is a material having reverse wavelength dispersion characteristics.

With the above configuration, the dispersion of the half-wave plate, the dispersion of the quarter-wave plate, and the dispersion of the liquid crystal layer cancel each other, thereby further improving reflectivity and contrast, and reducing color cast.

Optionally, the material having reverse wavelength dispersion characteristics is a cycloolefin polymer (COP). PC materials and liquid crystal materials having reverse wavelength dispersion characteristics can also be used to make the half-wave plate and the quarter-wave plate, and the present disclosure is not limited thereto.

Optionally, a retardation of the half-wave plate at a wavelength of 550 nm is in a range of 260 nm~280 nm, and a retardation of the quarter-wave plate at a wavelength of 550 nm is in a range of 130 nm~150 nm; alternatively, a retardation of the half-wave plate at a wavelength of 550 nm is 270 nm, and a retardation of the quarter-wave plate at a wavelength of 550 nm is 140 nm.

Optionally, the linear polarizer includes a polyvinyl alcohol film and a cellulose triacetate film stacked together.

The linear polarizer may include a polyvinyl alcohol (PVA) film and a cellulose triacetate (TAC) film stacked together. Thus, the linear polarizer can be constructed using only the polyvinyl alcohol film and the cellulose triacetate film, such that the structure is simple and easy to realize.

In the description of the present disclosure, the orientation or positional relationship of the terms "upper", "lower" and the like is based on the orientation or positional relationship shown in the drawings, and is merely for the convenience of describing the present disclosure and does not require that the disclosure must be constructed and operated in a specific orientation, therefore, it should not be construed as limiting the disclosure.

In the description of the present specification, the description of the terms "an embodiment", "another embodiment" or the like means that the specific features, structures, materials or characteristics described in connection with the embodiments are included in at least one embodiment of the present disclosure. In the present specification, the schematic representation of the above terms is not necessarily directed to the same embodiment or example. Furthermore, the particular features, structures, materials, or characteristics may be combined in a suitable manner in any one or more embodiments or examples. In addition, different embodiments or examples described in the specification and features of the various embodiments or examples may be combined by those skilled in the art without contradicting each other. Further, it should be noted that in the present specification, the terms "first" and "second" are used for descriptive purposes only, and are not to be construed as indicating or implying a relative importance or implicitly indicating the number of the technical features indicated.

Apparently, the person skilled in the art may make various alterations and variations to the disclosure without departing from the spirit and scope of the disclosure. As such, provided that these modifications and variations of the disclosure pertain to the scope of the claims of the disclosure and their equivalents, the disclosure is intended to embrace these alterations and variations.

What is claimed is:

1. An optical assembly, comprising: a linear polarizer, a half-wave plate, and a quarter-wave plate stacked in sequence, wherein an absorption axis of the linear polarizer is substantially perpendicular to a first direction, and the first direction is parallel to a surface of the linear polarizer; an angle between an in-plane slow axis of the half-wave plate and the first direction is in a range of 100° to 110°; an angle between an in-plane slow axis of the quarter-wave plate and the first direction is in a range of 160° to 170°.

2. The optical assembly according to claim 1, wherein the absorption axis of the linear polarizer is perpendicular to the first direction; the angle between the in-plane slow axis of the half-wave plate and the first direction is 105°; the angle between the in-plane slow axis of the quarter-wave plate and the first direction is 165°.

3. The optical assembly according to claim 1, wherein at least one of a material of the half-wave plate and a material of the quarter-wave plate is a material having reverse wavelength dispersion characteristics; the material having reverse wavelength dispersion characteristics is a cycloolefin polymer.

4. The optical assembly according to claim 1, wherein a retardation of the half-wave plate at a wavelength of 550 nm is in a range of 260 nm~280 nm, and a retardation of the quarter-wave plate at a wavelength of 550 nm is in a range of 130 nm~150 nm; alternatively, a retardation of the half-wave plate at a wavelength of 550 nm is 270 nm, and a retardation of the quarter-wave plate at a wavelength of 550 nm is 140 nm.

5. A liquid crystal display device, comprising: an optical assembly and a liquid crystal cell stacked together,
   wherein the optical assembly comprises a linear polarizer, a half-wave plate, and a quarter-wave plate stacked in sequence,
   wherein an absorption axis of the linear polarizer is substantially perpendicular to a first direction, and the first direction is parallel to a surface of the linear polarizer; an angle between an in-plane slow axis of the half-wave plate and the first direction is in a range of 100° to 110°; an angle between an in-plane slow axis of the quarter-wave plate and the first direction is in a range of 160° to 170°, and
   wherein the liquid crystal cell is on a side of the quarter-wave plate away from the linear polarizer.

6. The liquid crystal display device according to claim 5, wherein the liquid crystal cell is a twisted nematic liquid crystal cell, and a twist angle of the twisted nematic liquid crystal cell is in a range of 70° to 80°.

7. The liquid crystal display device according to claim 6, wherein a retardation of the liquid crystal cell at a wavelength of 550 nm is in a range of 180 nm~210 nm.

8. The liquid crystal display device according to claim 5, wherein the liquid crystal cell comprises a first substrate and a second substrate, the first substrate is between the second substrate and the optical assembly; the first substrate comprises a first alignment layer, and an angle between an orientation direction of the first alignment layer and the first direction is in a range of 220° to 230°; the second substrate comprises a second alignment layer, and an angle between an orientation direction of the second alignment layer and the first direction is in a range of 110° to 130°.

9. The liquid crystal display device according to claim 8, wherein the angle between the orientation direction of the first alignment layer and the first direction is 225°; the angle between the orientation direction of the second alignment layer and the first direction is 120°.

10. The liquid crystal display device according to claim 5, wherein the absorption axis of the linear polarizer is perpendicular to the first direction; the angle between the in-plane slow axis of the half-wave plate and the first direction is 105°; the angle between the in-plane slow axis of the quarter-wave plate and the first direction is 165°.

11. The liquid crystal display device according to claim 5, wherein at least one of a material of the half-wave plate and a material of the quarter-wave plate is a material having reverse wavelength dispersion characteristics; the material having reverse wavelength dispersion characteristics is a cycloolefin polymer.

12. The liquid crystal display device according to claim 5, wherein a retardation of the half-wave plate at a wavelength of 550 nm is in a range of 260 nm~280 nm, and a retardation of the quarter-wave plate at a wavelength of 550 nm is in a range of 130 nm~150 nm; alternatively, a retardation of the half-wave plate at a wavelength of 550 nm is 270 nm, and a retardation of the quarter-wave plate at a wavelength of 550 nm is 140 nm.

13. An electronic equipment comprising the liquid crystal display device according to claim 5.

14. The electronic equipment according to claim 13, wherein the liquid crystal cell is a twisted nematic liquid crystal cell, and a twist angle of the twisted nematic liquid crystal cell is in a range of 70° to 80°.

15. The electronic equipment according to claim 14, wherein a retardation of the liquid crystal cell at a wavelength of 550 nm is in a range of 180 nm~210 nm.

16. The electronic equipment according to claim 13, wherein the liquid crystal cell comprises a first substrate and a second substrate, the first substrate is between the second substrate and the optical assembly; the first substrate comprises a first alignment layer, and an angle between an orientation direction of the first alignment layer and the first direction is in a range of 220° to 230°; the second substrate comprises a second alignment layer, and an angle between an orientation direction of the second alignment layer and the first direction is in a range of 110° to 130°.

17. The electronic equipment according to claim 16, wherein the angle between the orientation direction of the first alignment layer and the first direction is 225°; the angle between the orientation direction of the second alignment layer and the first direction is 120°.

18. The electronic equipment according to claim 13, wherein the absorption axis of the linear polarizer is perpendicular to the first direction; the angle between the in-plane slow axis of the half-wave plate and the first direction is 105°; and the angle between the in-plane slow axis of the quarter-wave plate and the first direction is 165°.

19. The electronic equipment according to claim 13, wherein at least one of a material of the half-wave plate and a material of the quarter-wave plate is a material having reverse wavelength dispersion characteristics; the material having reverse wavelength dispersion characteristics is a cycloolefin polymer.

20. The electronic equipment according to claim 13, wherein a retardation of the half-wave plate at a wavelength of 550 nm is in a range of 260 nm~280 nm, and a retardation of the quarter-wave plate at a wavelength of 550 nm is in a range of 130 nm~150 nm; alternatively, a retardation of the half-wave plate at a wavelength of 550 nm is 270 nm, and a retardation of the quarter-wave plate at a wavelength of 550 nm is 140 nm.

* * * * *